(12) United States Patent
Onose et al.

(10) Patent No.: US 11,986,892 B2
(45) Date of Patent: May 21, 2024

(54) MACHINING TOOL

(71) Applicant: HONDA MOTOR CO., LTD., Tokyo (JP)

(72) Inventors: Junya Onose, Tokyo (JP); Ryuji Daikyoku, Tokyo (JP); Akihiro Osawa, Tokyo (JP); Yusaku Kotaki, Tokyo (JP); Tomoya Kuroda, Tokyo (JP); Takayuki Konno, Tokyo (JP); Mayumi Saruyama, Tokyo (JP); Kyoko Tabata, Tokyo (JP); Kazuya Sakaibara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 17/681,959

(22) Filed: Feb. 28, 2022

(65) Prior Publication Data
US 2022/0314345 A1 Oct. 6, 2022

(30) Foreign Application Priority Data
Mar. 31, 2021 (JP) .................. 2021-060702

(51) Int. Cl.
*B23C 5/10* (2006.01)
*B23B 27/22* (2006.01)
*B23B 51/10* (2006.01)

(52) U.S. Cl.
CPC ............... *B23C 5/10* (2013.01); *B23B 27/22* (2013.01); *B23B 51/107* (2013.01); *B23B 51/109* (2022.01); *B23B 2251/48* (2013.01)

(58) Field of Classification Search
CPC ......... B23B 27/16; B23B 27/22; B23B 47/34; B23B 51/10; B23B 51/101; B23B 51/102;
(Continued)

(56) References Cited

U.S. PATENT DOCUMENTS

| | | | | |
|---|---|---|---|---|
| 220,132 A | * | 9/1879 | Elliot | ............... E21B 10/44 |
| | | | | 175/388 |
| 4,240,806 A | * | 12/1980 | Frantzen | ........... B24D 11/003 |
| | | | | 407/29.1 |

(Continued)

FOREIGN PATENT DOCUMENTS

| | | | |
|---|---|---|---|
| DE | 202018107335 U1 | * | 4/2020 |
| JP | 10-501472 | | 2/1998 |

(Continued)

OTHER PUBLICATIONS

Japanese Office Action for Japanese Patent Application No. 2021-060702 dated Jan. 31, 2023.

*Primary Examiner* — Nicole N Ramos
(74) *Attorney, Agent, or Firm* — Amin, Turocy & Watson, LLP

(57) ABSTRACT

A machining tool is rotated around an axis and includes a machining blade portion having a first machining blade in the distal end direction with respect to a rake face and a second machining blade located in the radially outward direction with respect to the rake face, and a protrusion formed on the rake face and having a tip for cutting chips coming from the first machining blade. The protrusion includes an inner forming portion that is located in the radially inward direction from the reference line and an outer forming portion that is located in the radially outward direction from the reference line, and the width of the inner forming portion is wider than the width of the outer forming portion.

12 Claims, 6 Drawing Sheets

(58) Field of Classification Search
CPC ... B23B 51/103; B23B 51/106; B23B 51/108; B23B 51/109; B23B 2200/08; B23B 2200/081; B23B 2200/321; B23C 5/165; B23C 5/205; B23C 2200/08; B23C 2200/081; B23C 2200/323

See application file for complete search history.

(56) References Cited

U.S. PATENT DOCUMENTS

| | | | | |
|---|---|---|---|---|
| 4,487,534 A * | 12/1984 | Reiter | ............... | B23B 27/143 |
| | | | | 407/114 |
| 4,934,879 A * | 6/1990 | van Barneveld | ..... | B23B 27/143 |
| | | | | 407/115 |
| 4,978,260 A * | 12/1990 | Lynde | ............... | B23P 15/28 |
| | | | | 166/55.6 |
| 5,027,914 A * | 7/1991 | Wilson | ............... | E21B 29/002 |
| | | | | 408/232 |
| 5,525,016 A * | 6/1996 | Paya | ............... | B23B 27/141 |
| | | | | 407/116 |
| 5,626,189 A * | 5/1997 | Hutchinson | ............... | E21B 29/00 |
| | | | | 166/55.6 |
| 5,816,753 A * | 10/1998 | Hall | ............... | B23B 51/00 |
| | | | | 408/223 |
| 5,839,857 A | 11/1998 | Paya | | |
| 5,908,071 A * | 6/1999 | Hutchinson | ............... | E21B 29/00 |
| | | | | 166/55.6 |
| 7,226,250 B2 * | 6/2007 | Gatton | ............... | B23B 51/00035 |
| | | | | 408/1 R |
| 7,883,302 B2 * | 2/2011 | Kobatake | ............... | B23Q 11/1023 |
| | | | | 408/56 |
| 8,210,777 B2 * | 7/2012 | Ishida | ............... | B23C 5/06 |
| | | | | 407/66 |
| 9,028,178 B2 * | 5/2015 | Nedzlek | ............... | B23D 77/14 |
| | | | | 408/83.5 |
| 10,632,542 B2 * | 4/2020 | Harada | ............... | B23K 26/355 |
| 2004/0028492 A1 * | 2/2004 | Jager | ............... | B23C 5/2493 |
| | | | | 408/231 |
| 2007/0079489 A1 * | 4/2007 | Cirino | ............... | B23B 31/36 |
| | | | | 29/33 K |
| 2012/0301234 A1 * | 11/2012 | Yamaguchi | ............... | B23B 51/00 |
| | | | | 407/115 |

FOREIGN PATENT DOCUMENTS

| | | | |
|---|---|---|---|
| JP | 2013-154438 | 8/2013 | |
| JP | 5271867 | 8/2013 | |
| WO | WO-0160554 A1 * | 8/2001 | ........... B23B 27/045 |

\* cited by examiner

MACHINING TOOL

CROSS-REFERENCE TO RELATED APPLICATIONS

This application is based upon and claims the benefit of priority from Japanese Patent Application No. 2021-060702 filed on Mar. 31, 2021, the contents of which are incorporated herein by reference.

BACKGROUND OF THE INVENTION

Field of the Invention

The present invention relates to a machining tool that is rotated and cuts a workpiece.

Description of the Related Art

A work piece is machined using a machining tool to create various members, such as an engine. The engine has a variety of bottom and bottomless hole shapes. These hole shapes are used, for example, for insertion of fastening bolts, installation of oil pipes, guide of intake and exhaust valves, installation of spark plugs, and installation of fuel injection valves. In order to form these hole shapes, a hole is made in a workpiece using a machining tool, and bearing surface machining is performed at the opening of the hole.

In this case, chips produced by machining the workpiece may remain in the workpiece (eventually, in a produced member). Chips remaining in the member may interfere with operations of the member. Therefore, generally, the machined workpiece is cleaned with a solvent to remove chips from the workpiece. However, depending on the shape of the chips, the chips may be caught inside the workpiece. In this case, even if the workpiece is cleaned, the chips are not easily removed from the workpiece.

In order to prevent the chips from remaining in the workpiece, it is preferable to regulate the width, length, or shape of the chips. If the chips are wide or long, they are difficult to remove by cleaning. For this reason, a machining tool having a breaker (for example, a protrusion) for breaking or shaping chips has been developed (for example, see JP H10-501472 A).

Repeated machining by the machining tool can break the breaker of the machining tool. That is, because the breaker is thin and small in size so that the breaker does not interfere with the machining, the breaker is susceptible to breakage. In particular, if a machining tool has a plurality of types of blades for processing a plurality of portions, the breaker is susceptible to breakage. This is because chips formed by the plurality of types of blades come into contact with the breaker from different directions. The processing of a plurality of portions includes, for example, formation of a bearing surface and removal of unnecessary portions (excess thickness) around the bearing surface.

SUMMARY OF THE INVENTION

It is an object of the present invention to improve the durability of a breaker of a machining tool having a plurality of types of blades. An object of the present invention is to solve the above-mentioned problems.

A machining tool for machining a workpiece by being rotated around an axis includes: a machining blade portion including a rake face, a first machining blade arranged in the distal end direction of the machining tool with respect to the rake face, and a second machining blade arranged, with respect to the axis as a reference, in the radially outward direction with respect to the rake face; and at least one protrusion formed on the rake face and having a tip for cutting a chip generated by the first machining blade, wherein the at least one protrusion has a tapered shape that becomes narrower toward the tip in a plan view with respect to the rake face as a reference, and when a line passing through the tip and parallel to the axis line is a reference line, the protrusion closest to the second machining blade among the at least one protrusion has an inner forming portion located in the radially inward direction from the reference line and an outer forming portion located in the radially outward direction from the reference line, wherein the width of the inner forming portion is wider than the width of the outer forming portion.

According to the present invention, a protrusion (breaker) having improved durability can be provided for a machining tool having a plurality of types of machining blades.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a machining tool according to an embodiment of the present invention will be described.

Figure 1:
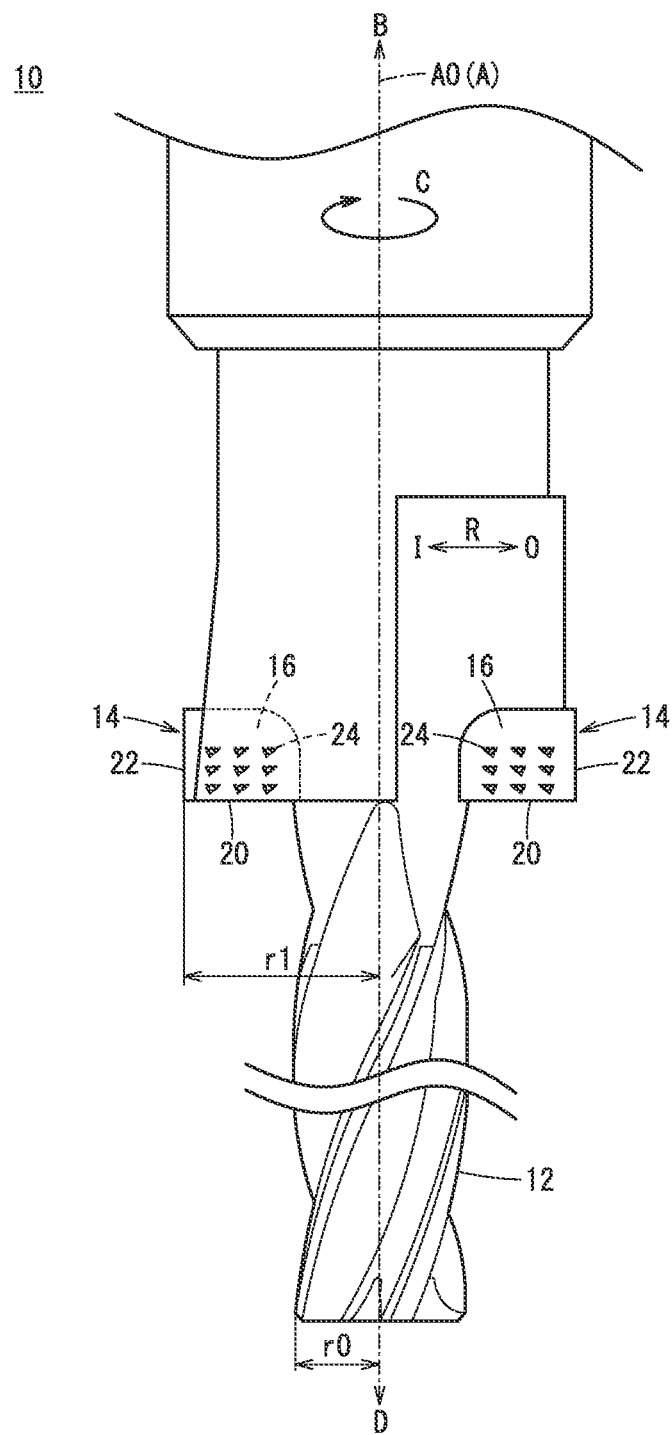
FIG. 1 is a view showing a machining tool according to an embodiment of the present invention.

FIG. 1 shows a machining tool 10 according to an embodiment of the present invention. The machining tool 10 machines a workpiece W while rotating in a rotational direction C about an axis A0. The distal end direction D and the proximal end direction B of the machining tool 10 are respectively indicated by the up and down arrows in FIG. 1. A direction along the axis A0 is referred to as an axial direction A. The radial direction R of the machining tool 10 is a direction orthogonal to the axis A0. The radially outward direction O is a radial direction R from the axis A0 toward the outer periphery. The radially inward direction I is a radial direction R from the outer periphery toward the axis A0.

The machining tool 10 has a hole-opening blade portion 12 and a plurality (here, two) of machining blade portions 14. The hole-opening blade portion 12 is, for example, a drill and drills a hole in the workpiece W. The hole-opening blade portion 12 is disposed at the distal end of the machining tool 10. That is, the hole-opening blade portion 12 is disposed in the distal end direction D with respect to the plurality of machining blade portions 14. Each of the plurality of machining blade portions 14 includes a rake face 16, a first machining blade 20, a second machining blade 22, and a plurality of protrusions 24. The plurality of machining blade portions 14 machine the periphery of a hole opened by the hole-opening blade portion 12. Each of the plurality of machining blade portions 14 uses the first machining blade 20 and the second machining blade 22 for this machining. Here, the two machining blade portions 14 are disposed on opposite sides of the axis A0.

The rake face 16 is a surface chips pass when the machining blade portion 14 machines the workpiece W. Here, the rake face 16 functions as a rake face for both the first machining blade 20 and the second machining blade 22. That is, chips coming from the first machining blade 20 and chips coming from the second machining blade 22 pass over the rake face 16.

The first machining blade 20 is arranged in the distal end direction D of the machining tool 10 with respect to the rake face 16. The first machining blade 20 machines the workpiece W while rotating about the axis A0. Thus, a plane (specifically, a circular plane) orthogonal to the axis A0 is formed on the workpiece W. The second machining blade 22 is disposed radially outward direction O with respect to the rake face 16. The second machining blade 22 machines the workpiece W while rotating about the axis A0. Thus, a curved surface with the axis A0 at the center thereof is formed on the workpiece W.

Here, the first machining blade 20 and the second machining blade 22 (eventually, the machining blade portion 14) machine a wider range than the hole-opening blade portion 12. Therefore, the distance (radius r1) from the axis A0 to the second machining blade 22 in the radially outward direction O is larger than the radius r0 of the hole-opening blade portion 12. That is, the radius r1 of the flat surface and the curved surface formed by the first machining blade 20 and the second machining blade 22 is larger than the radius r0 of a hole opened by the hole-opening blade portion 12.

Figure 2:
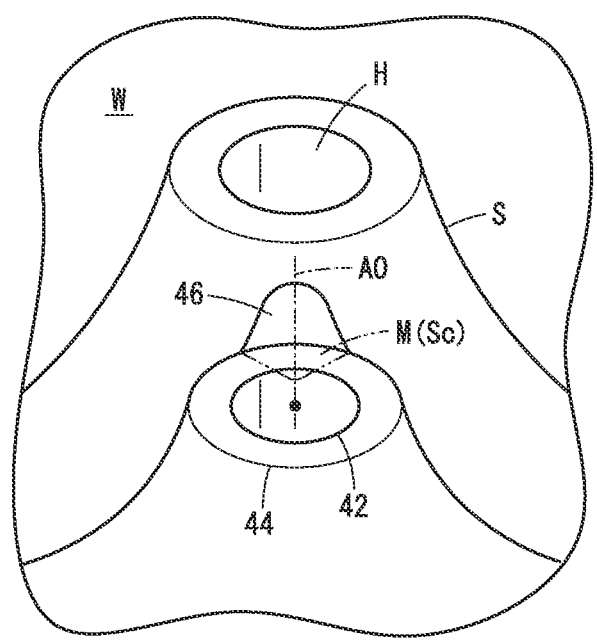
FIG. 2 is a view showing an example of a workpiece machined by a machining tool.

The workpiece W to be machined by the machining tool 10 will be described. FIG. 2 is a view showing an example of the workpiece W machined by the machining tool 10. The workpiece W is, for example, a workpiece W for a cylinder head of an engine. It is now considered that a hole 42 is formed in the workpiece W by drilling the workpiece W with the machining tool 10. In this case, in general, an unnecessary portion (excess thickness) around the portion to be drilled is removed before the drilling. Here, part of a sidewall S surrounding a hole H is the unnecessary portion.

Here, the machining tool 10 forms the hole 42, a bearing surface 44, and a sidewall cutting surface 46 in the vicinity of the sidewall S. The formation of the hole 42, the bearing surface 44, and the sidewall cutting surface 46 can be performed simultaneously with the machining tool 10 having a plurality of blades (the hole-opening blade portion 12, the first machining blade 20, and the second machining blade 22). However, in a case where the machining tool 10 does not machine a portion near the sidewall S, the machining tool 10 does not form the sidewall cutting surface 46.

The hole-opening blade portion 12 forms the hole 42 with the axis A0 of the machining tool 10 at the center of the hole 42. The hole 42 is, for example, a valve guide hole. A valve guide is press-fitted into the valve guide hole. The valve guide guides an intake valve (or exhaust valve) of the engine.

The first machining blade 20 forms the bearing surface 44 around the hole 42 as a plane orthogonal to the axis A0. The bearing surface 44 is, for example, a valve spring bearing surface. The valve spring bearing surface is located on an opening end surface of the valve guide hole (hole 42). A spring (valve spring) for opening and closing a valve is arranged on a valve spring bearing surface.

The second machining blade 22 cuts the sidewall S that is located around the bearing surface 44, thereby forming the sidewall cutting surface 46 as a curved surface centered on the axis A0. The machining tool 10 may machine a workpiece W having sidewalls S to form the bearing surface 44 near the sidewalls S. In this case, there is a fear that the machining tool 10 should interfere with the sidewall S that is located near the bearing surface 44. A portion Sc of the sidewall S that interferes with the machining tool 10 needs to be removed as the excess thickness M. If the workpiece W is machined without removing the portion Sc, there is a possibility that the axis A0 will be shifted from the original machining center. Therefore, in addition to the formation of the hole 42 with the hole-opening blade portion 12 and the formation of the bearing surface 44 with the first machining blade 20, the machining tool 10 removes the excess thickness M with the second machining blade 22.

Figure 3:
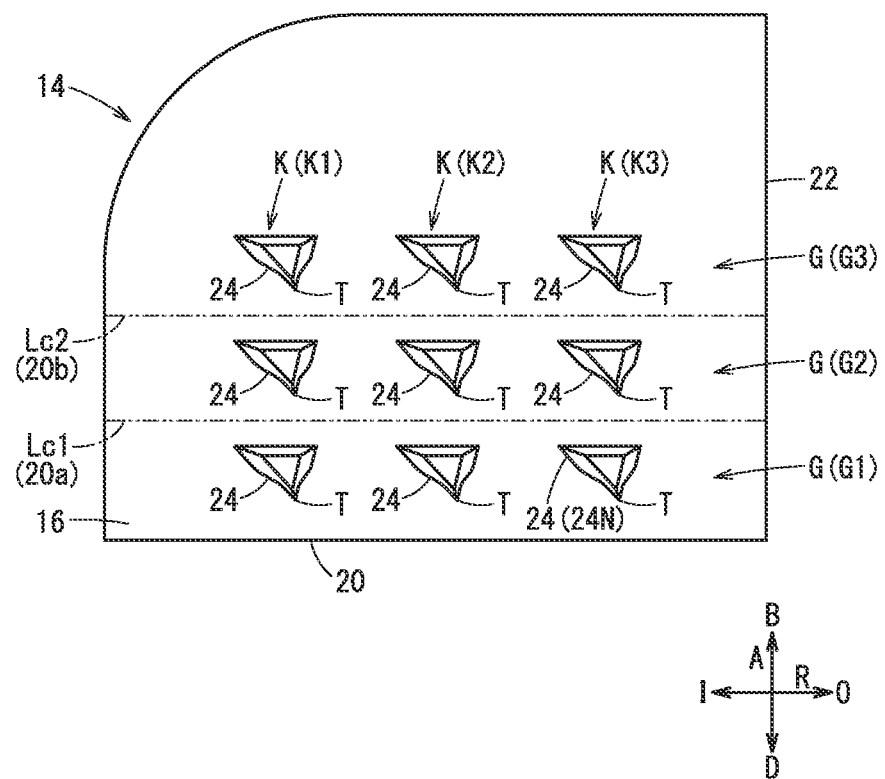
FIG. 3 is an enlarged view of a machining blade portion.

FIG. 3 is an enlarged view of the machining blade portion 14. A plurality of protrusions 24 having tips (T) are arranged on the rake face 16. The plurality of protrusions 24 are arranged in the radial direction R and the axial direction A (the direction along the axis A0). Here, three protrusions 24 form a column G (G1 to G3) in the radial direction R, and three protrusions 24 form a row K (K1 to K3) in the axial direction A.

Among the protrusions 24 of the three rows G1 to G3, the plurality of protrusions 24 in the row G1 closest to the first machining blade 20 function as a breaker. The tip T of the protrusion 24 cuts the chips ch1 coming from the first machining blade 20 into a plurality of chips ch1 (see FIG. 4). Here, the three tips T of the protrusions 24 in the row G1 cut the chips ch1 coming from the first machining blade 20 into four chips arranged in the radial direction R. On the other hand, when the protrusions 24 of the row G1 are present, the protrusions 24 of the remaining rows G2 and G3 do not cut the chips ch1 coming from the first machining blade 20 and consequently do not function as a breaker.

The protrusions 24 of rows G2 and G3 function as a breaker when a new first machining blade 20 is formed because of wear or breakage of the first machining blade 20. That is, when the first machining blade 20 wears out, the machining blade portion 14 is polished from the first machining blade 20 to the line Lc1 to form a new first machining blade 20a at the line Lc1. As a result, the protrusions 24 of the row G2 function as a breaker. Further, when the first machining blade 20a at the position of the line Lc1 wears out, the machining blade portion 14 is polished from the line Lc1 to the line Lc2, thereby forming a new first machining blade 20b at the position of a line Lc2. As a result, the protrusions 24 of the row G3 function as a breaker. By forming the protrusions 24 of the rows G2 and G3 in advance in this manner, it is not necessary to form the new protrusions 24 by laser processing or the like when the new first machining blades 20a and 20b are formed.

Figure 4:
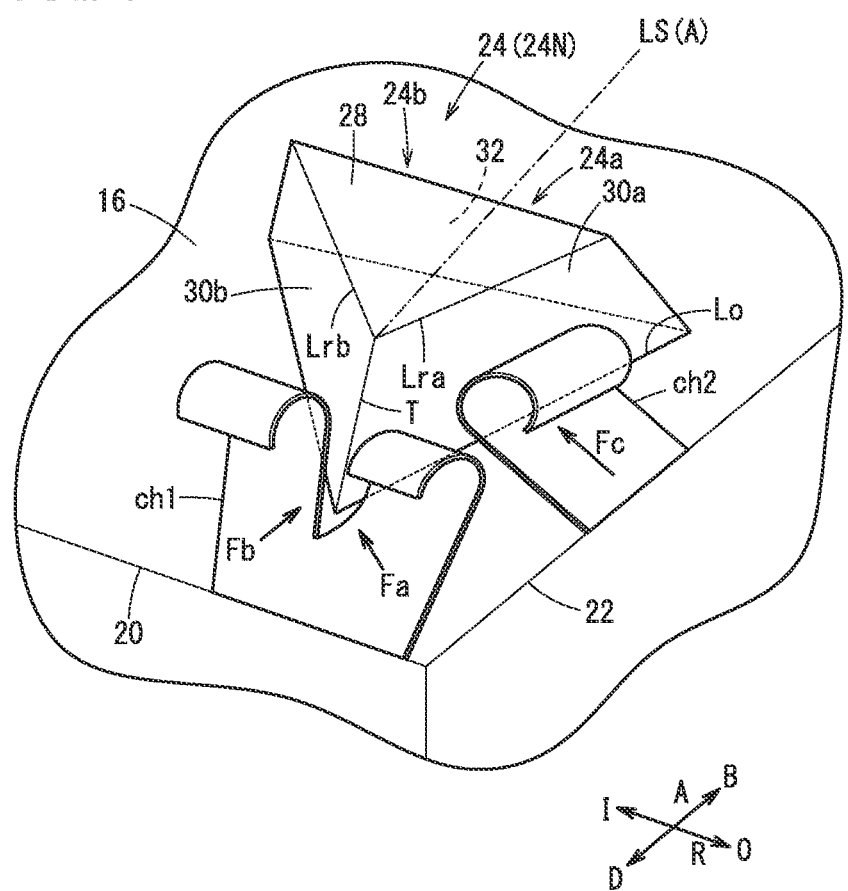
FIG. 4 is an enlarged perspective view of a protrusion.

FIG. 4 is an enlarged perspective view of the protrusion 24. FIG. 4 shows a protrusion 24N (a protrusion 24 at the lower right in FIG. 3) closest to the first machining blade 20 and the second machining blade 22. Here, the plurality of protrusions 24 have the same shape.

In a plan view with respect to the rake face 16, the protrusion 24 has a tapered shape (in this case, a substantially triangular shape) that becomes narrower toward the tip T. More specifically, the protrusion 24 has a top surface 28, side surfaces 30a, 30b, and a back surface 32. The top surface 28 is an end surface in a protruding direction from the rake face 16. The side surface 30a is a side surface in the radially outward direction O. The side surface 30b is a side surface in the radially inward I direction. The tip T is formed at the boundary between the side surface 30a and the side surface 30b. A ridge line Lra is formed between the top surface 28 and the side surface 30a. A ridge line Lrb is formed between the top surface 28 and the side surface 30b.

When the workpiece W is being machined with both the first machining blade 20 and the second machining blade 22, the first machining blade 20 generates a chip ch1, and the second machining blade 22 generates a chip ch2. Actually, because the chips ch1 and ch2 are wide, they may overlap each other. However, for the sake of simplicity, only a part of the width direction of the chips ch1 and ch2 is shown here.

As described above, the protrusion 24 cuts the chip ch1 coming from the first machining blade 20 with the tip T. Further, the protrusion 24 curls the cut chips ch1 to form a roll. On the other hand, the protrusion 24 curls the chip ch2 coming from the second machining blade 22 to form a roll. In this manner, the protrusion 24 not only cuts the chip ch1 but also curls the chips ch1 and ch2 into rolls.

At this time, the chip ch1 applies a force Fa to the side surface 30a and a force Fb to the side surface 30b. On the other hand, the chip ch2 applies a force Fc to the side surface 30a. That is, the chip ch2 applies the force Fc to the side surface 30a and does not apply a force to the side surface 30b. As a result, the protrusion 24N closest to the first machining blade 20 and the second machining blade 22 receives the forces Fa, Fb, and Fc from the chips ch1 and ch2. Therefore, the protrusion 24N is more easily broken than the other protrusions 24. As described below, in the present embodiment, the protrusion 24N has an asymmetric shape in the radially inward direction I and the radially outward direction O. Thus, the protrusion 24N can withstand the forces Fa, Fb, and Fc, in particular the force Fc. Therefore, the protrusion 24N is unlikely to be broken.

Figure 5:
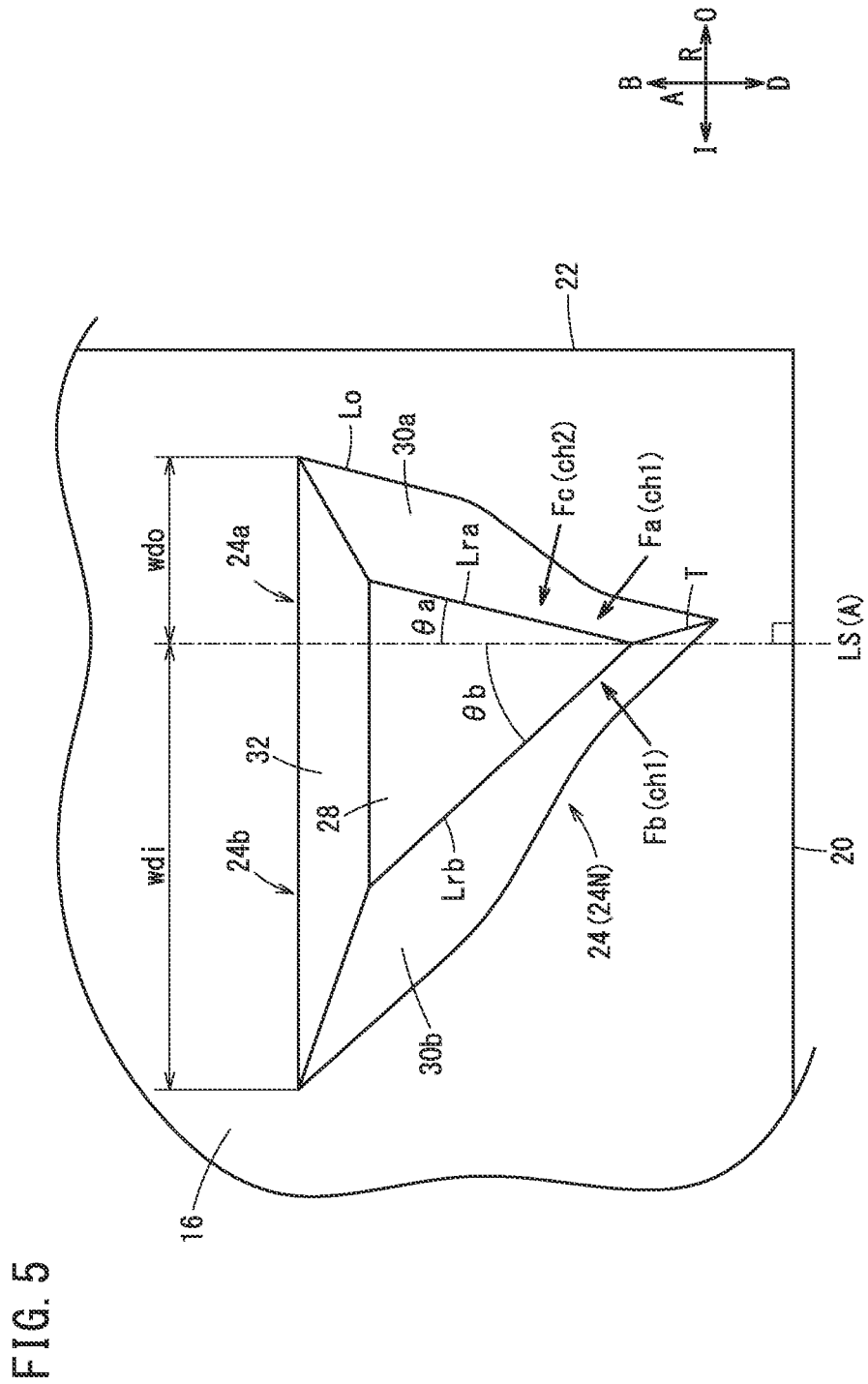
FIG. 5 is a plan view showing the protrusion in an enlarged manner.

FIG. 5 is an enlarged plan view of the protrusion 24N. A line passing through the tip T and being parallel to the axis A0 (a line in the axial direction A) is defined as a reference line LS. Here, the protrusion 24 is separated by the reference line LS. A portion of the protrusion 24 in the radially outward direction O from the reference line LS (on the second machining blade 22 side from the reference line LS) is referred to as an outer forming portion 24a. A portion of the protrusion 24 in the radially inward direction I from the reference line LS (on the axis line A0 side from the reference line LS) is referred to as an inner forming portion 24b. At this time, the shape of the protrusion 24N is asymmetric with respect to the reference line LS. That is, the width wdi of the inner forming portion 24b is larger than the width wdo of the outer forming portion 24a. Here, the width wdi is preferably three times or longer than the width wdo. The volume Vdi of the inner forming portion 24b is preferably three times or larger than the volume Vdo of the outer forming portion 24a. Further, the angle θa of the ridge line Lra with respect to the axis line A0 (reference line LS) is preferably 5 degrees or more and 20 degrees or less. The angle θb of the ridge line Lrb with respect to the axis line A0 (reference line LS) is preferably 30 degrees or more and 80 degrees or less.

The side surface 30a is not a uniform plane. In particular, the side surface 30a has a curved surface shape in the vicinity of the rake face 16. As a result, the ridge line Lo between the side surface 30a and the rake face 16 has a curved shape. That is, the angle of the ridge line Lo with respect to the reference line LS is relatively small in the vicinity of the tip T and tends to become larger as the distance from the vicinity of the tip T increases. The side surface 30a having a curved surface shape more easily lets the chip ch2 coming from the second machining blade 22 flow in the proximal end direction B (back flow) than the side surface 30a having a flat shape. Therefore, by forming the side surface 30a into a curved surface shape, the force Fc of the chip ch2 is applied less to the side surface 30a (that is, the protrusion 24).

As described above, the machining tool 10 according to the present embodiment can perform the drilling process with the hole-opening blade portion 12, the formation of the seat surface 44 with the first machining blade 20, and the removal of the excess thickness M with the second machining blade 22 (FIGS. 1 and 2). The protrusion 24 of the machining tool 10 cuts and curls into rolls the chip ch1 coming from the first machining blade 20 and curls into rolls the chip ch2 coming from the second machining blade 22. This makes it easy to remove the chips ch1 and ch2 from the inside of the workpiece W (FIG. 4). The protrusion 24 has an asymmetric shape in the radial direction R. That is, the width wdi of the inner forming portion 24b is larger than the width wdo of the outer forming portion 24a (FIG. 5). As a result, the durability of the protrusion 24 is improved. That is, the protrusion 24 is less likely to be broken by the chips ch2 coming from the second machining blade 22.

Figure 6A:
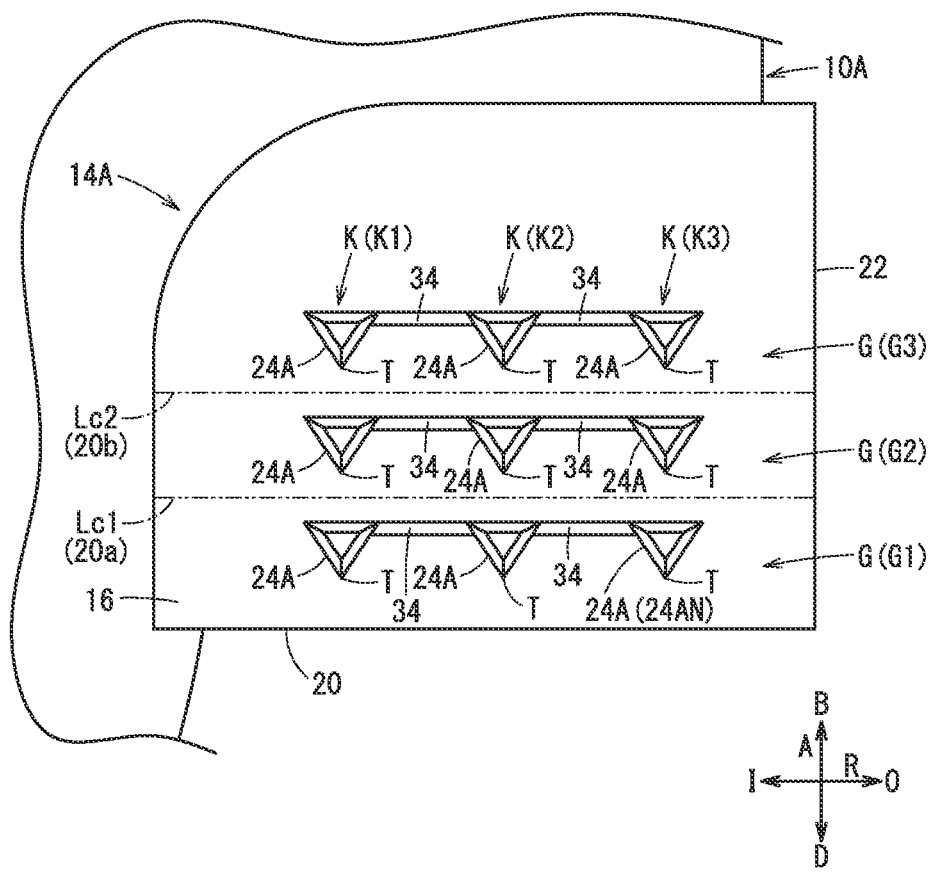
FIGS. 6A and 6B are views showing a machining blade portion of a machining tool according to another configuration.
Figure 6B:
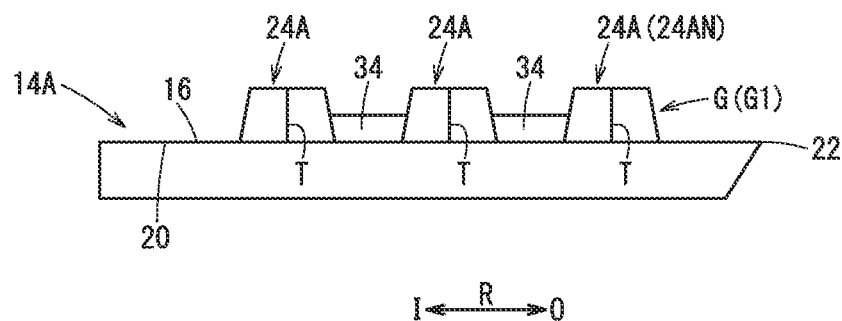

FIGS. 6A and 6B are views showing a machining blade portion 14A of a machining tool 10A according to another configuration. FIG. 6A corresponds to FIG. 3 and shows the machining blade portion 14A viewed from the direction perpendicular to the rake face 16. FIG. 6B shows the machining blade portion 14A as viewed from the distal end direction D of the machining tool 10A. The machining tool 10A is the same as the machining tool 10 except for the machining blade portion 14A. Regarding the machining tool 10A, the same elements as those of the machining tool 10 are denoted by the same reference numerals, and description thereof is omitted.

The machining blade section 14A of a machining tool 10A has a plurality of protrusions 24A and a plurality of connecting portions 34 on the rake face 16. The connecting portion 34 connects a plurality (here, three) of protrusions 24A in the radial direction R. That is, the plurality of protrusions 24A in each of the plurality of rows G (G1 to G3) are connected in the radial direction R by the connecting portions 34. Thus, by connecting the plurality of protrusions 24A with the connecting portion 34, the force Fc due to the chip ch2 coming from the second machining blade 22 is distributed to the plurality of protrusions 24A in each of the rows G. As a result, the plurality of protrusions 24A easily withstand the force Fc. In this case, the plurality of protrusions 24A of the machining tool 10A may have a shape that is not asymmetric in the radial direction R like the plurality of protrusions 24 of the machining tool 10.

Here, a plurality of (here, three) protrusions 24A arranged along the radial direction R and connected by the connecting portions 34 form a plurality of rows G1 to G3. Thus, in a case where a new first machining blade 20a is formed because the first machining blade 20 has worn out, it is not necessary to form the protrusion 24A and the connecting portion 34 by laser processing or the like.

(Modification)

The present invention is not limited to the above-described embodiments, and various configurations can be adopted without departing from the gist of the present invention. In the machining tool 10 (or the machining tool 10A), the two machining blade portions 14 (or the two machining blade portions 14A) are disposed at positions opposite to each other with respect to the axis A0. However, the number of the machining blade portions 14 (or the machining blade portions 14A) may be one or three or more. When the number of machining blade portions 14 (or the machining blade portions 14A) is plural, it is preferable that the plural machining blade portions 14 are arranged at intervals along an arc centered on the axis A0.

In the embodiment of the machining tool 10 (or the machining tool 10A), the number of protrusions 24 (or protrusions 24A) in each of the radial direction R and the axial direction A is three. However, the number of protrusions 24 (or protrusions 24A) in each of the radial direction R and the axial direction A may be one, two, or four or more. The number of protrusions 24 (or protrusions 24A) may be different between in the radial direction R and in the axial direction A. The protrusion 24 (or protrusion 24A) may be disposed only in the radial direction R or only in the axial direction A. Only one protrusion 24 (or protrusion 24A) may be provided.

In the embodiment of the machining tool 10, all of the plurality of protrusions 24 are formed in an asymmetric shape in the radial direction R. On the other hand, among the plurality of protrusions 24, only the protrusion 24N closest to the first machining blade 20 and the second machining blade 22 may have an asymmetric shape in the radial direction R. It is highly necessary for the protrusion 24N to be asymmetric in the radial direction R, but the other protrusions 24 is not required so much to have an asymmetric shape.

Part of the plurality of protrusions 24A of the machining tool 10A, for example, a protrusion 24AN, may have a shape that is asymmetric in the radial direction R, in a similar manner as the protrusions 24 of the machining tool 10.

Invention Obtained from Embodiment

The invention that can be understood from the above embodiment will be described below.

[1] A machining tool (10) for machining a workpiece (W) by being rotated around an axis (A0) includes a machining blade portion (14) including a rake face (16), a first machining blade (20) arranged in the distal end direction (D) of the machining tool with respect to the rake face, and a second machining blade (22) arranged with respect to the rake face in the radially outward direction (O) seen from the axis, and at least one protrusion (24) that includes a tip (T) for cutting a chip (ch1) generated by the first machining blade and is formed on the rake face, wherein the at least one protrusion has a tapered shape that becomes narrower toward the tip in a plan view with respect to the rake face, and when a line (A) passing through the tip and parallel to the axis is taken as a reference line (LS), the protrusion (24N) closest to the second machining blade among the at least one protrusion includes an inner forming portion (24*b*) located in a radially inward direction (I) from the reference line, and an outer forming portion (24*a*) located in the radially outward direction from the reference line, and the width (wdi) of the inner forming portion is wider than the width (wdo) of the outer forming portion. This improves the durability of the protrusion (breaker).

[2] The width of the inner forming portion is three or more times the width of the outer forming portion. Thus, the durability of the protrusion (breaker) is further improved.

[3] The volume (Vdi) of the inner forming portion is three times or larger than the volume (Vdo) of the outer forming portion. Thus, the durability of the protrusion (breaker) is further improved.

[4] The protrusion having the inner forming portion and the outer forming portion includes a top surface (28) forming an end surface in the protruding direction from the rake face, a side surface (30*a*) located in the radially outward direction, and a ridge line (Lra) between the top surface and the side surface, and the angle (θa) of the ridge line with respect to the axis is 5 degrees or more and 20 degrees or less. Thus, the durability of the protrusion (breaker) is further improved.

[5] A plurality of the at least one protrusion is formed along the direction of the axis. When the first machining blade wears and a new first machining blade is formed, it becomes unnecessary to form a new protrusion (breaker).

[6] The plurality of at least one protrusion is formed along the radial direction (R) of the machining tool. Thus, the chips can be cut into three or more pieces by the plurality of protrusions.

[7] A machining tool for machining a work by being rotated around an axis, the machining tool including: a machining blade portion having a rake face, a first machining blade arranged in the distal end direction of the machining tool with respect to the rake face, and a second machining blade arranged with respect to the rake face in the radially outward direction seen from the axis; a plurality of protrusions (24A) having a tip for cutting chips generated by the first machining blade and formed on the rake face so as to be formed in a line along the radial direction of the machining tool; and a connecting portion (34) that connects the plurality of protrusions. Thus, the plurality of protrusions (breakers) can cut the chips into three or more pieces, and are connected by connecting portions, so that the durability of the protrusions is improved.

[8] A machining tool is provided with a plurality of second protrusions (24A) that are arranged more toward the proximal end direction (B) of the machining tool than the protrusions in a line, include a tip, and are formed on the rake face so as to be formed in a line along the radial direction, and a second connecting portion (34) that connects the plurality of second protrusions. This makes it unnecessary to form a new protrusion (breaker) when the first machining blade wears and a new first machining blade is formed.

[9] The first machining blade machines the workpiece to form a plane (bearing surface 44) orthogonal to the axis, and the second machining blade machines the workpiece to form a curved surface (sidewall cutting surface 46) with the axis at the center. As a result, it is possible to form the bearing surface and remove the excess thickness around the bearing surface.

[10] The machining tool includes a plurality of the machining blade portions arranged along an arc with the axis at the center. This makes it possible to perform efficient machining using a plurality of machining blade portions.

[11] The machining tool includes a hole-opening blade portion (12) that is disposed more toward the distal end direction than the machining blade portion and has a radius (r0) smaller than a distance (r1) from the axis to the second machining blade. This makes it possible to form a hole in the workpiece with the hole-opening blade portion and at the same time to form a bearing surface at the end surface of the hole and to remove the excess thickness around the bearing surface.

[12] The workpiece is a workpiece for a cylinder head of an engine, and the hole-opening blade portion forms a valve guide hole (42) into which a valve guide of an intake valve or an exhaust valve is press-fitted, the first machining blade forms a valve spring bearing surface (44) on the opening end surface of the valve guide hole, and the second machining blade cuts a side wall (S) on the work. As a result, it is possible to form the valve guide hole of the cylinder head of the engine, the valve spring seat surface, and to cut the side wall (excess thickness).

What is claimed is:

1. A machining tool for machining a workpiece by being rotated about an axis, the machining tool comprising:
a machining blade portion including
a rake face,
a first machining blade arranged in a distal end direction of the machining tool with respect to the rake face, and
a second machining blade arranged with respect to the rake face in a radially outward direction seen from the axis; and
at least one protrusion and at least one second protrusion, wherein each of the at least one protrusion and the at least one second protrusion includes a tip that cuts a chip generated by the first machining blade and is formed on the rake face,
wherein
the at least one protrusion and the at least one second protrusion each have a tapered shape that becomes narrower toward the first machining blade in a plan view with respect to the rake face,
the at least one protrusion and the at least one second protrusion each include
a first side surface that faces in the radially outward direction,
a second side surface that is adjacent to the first side surface and faces in a radially inward direction, and
a top surface that forms an end surface in a protruding direction seen from the rake face,
the tip is formed at a boundary between the first side surface and the second side surface and extends from the top surface toward the first machining blade,
a first ridge line is formed between the first side surface and the top surface,
a second ridge line is formed between the second side surface and the top surface,
the at least one second protrusion is closest to the second machining blade than the at least one protrusion, and includes
an inner forming portion located further radially inward than a reference line that is a line passing through the tip and a point of intersection between first ridge line and the second ridge line and is parallel to the axis and
an outer forming portion located further radially outward than the reference line,
a width of the inner forming portion is larger than a width of the outer forming portion,
the first ridge line is located further radially outward than the reference line, and
the second ridge line is located further radially inward than the reference line.

2. The machining tool according to claim 1, wherein the width of the inner forming portion is three or more times the width of the outer forming portion.

3. The machining tool according to claim 1, wherein a volume of the inner forming portion is three times or larger than a volume of the outer forming portion.

4. The machining tool according to claim 1, wherein an angle of the first ridge line with respect to the axis is 5 degrees or more and 20 degrees or less.

5. The machining tool according to claim 1, wherein the at least one protrusion and the at least one second protrusion each comprise a plurality of protrusions formed along a direction of the axis.

6. The machining tool according to claim 1, wherein the at least one protrusion comprises a plurality of protrusions formed along a radial direction of the machining tool.

7. The machining tool according to claim 1, wherein the first machining blade machines the workpiece to form a plane orthogonal to the axis; and
the second machining blade machines the workpiece to form a curved surface with the axis at a center of the curved surface.

8. The machining tool according to claim 1, comprising twos or more of the machining blade portions arranged along an arc with the axis at a center.

9. The machining tool according to claim 1, comprising a hole-opening blade portion arranged more toward the distal end direction than the machining blade portion and having a radius smaller than a distance from the axis to the second machining blade.

10. The machining tool according to claim 9, wherein:
the workpiece is a workpiece for a cylinder head of an engine,
the hole-opening blade portion forms, in the workpiece, a valve guide hole into which a valve guide of an intake valve or an exhaust valve is press-fitted,
the first machining blade forms a valve spring bearing surface on an opening end surface of the valve guide hole, and
the second machining blade machines a side wall on the workpiece.

11. The machining tool according to claim 1, wherein an angle of the second ridge line with respect to the reference line is larger than an angle of the first ridge line with respect to the reference line.

12. The machining tool according to claim 1, wherein a third ridge line is formed between the first side surface and the rake face,
the third ridge line has a curved shape,
the third ridge line includes a first segment and a second segment, wherein the first segment is closer to the tip than the second segment, and
an angle of the first segment to the reference line is larger than an angle of the second segment to the reference line.

* * * * *